April 30, 1940.   G. J. BARRETT ET AL   2,199,020
CUTTING TOOL
Original Filed May 17, 1938   4 Sheets-Sheet 1
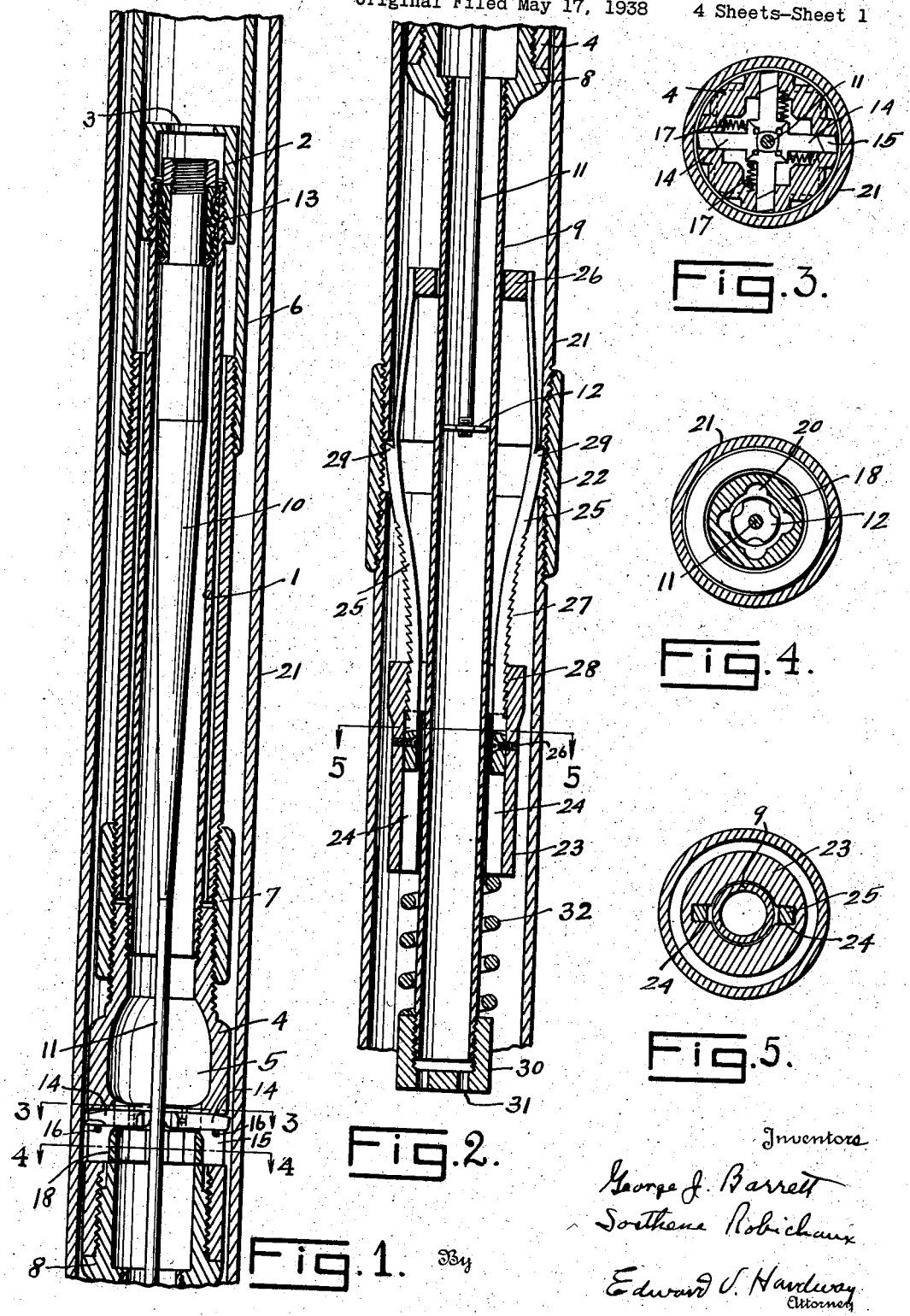

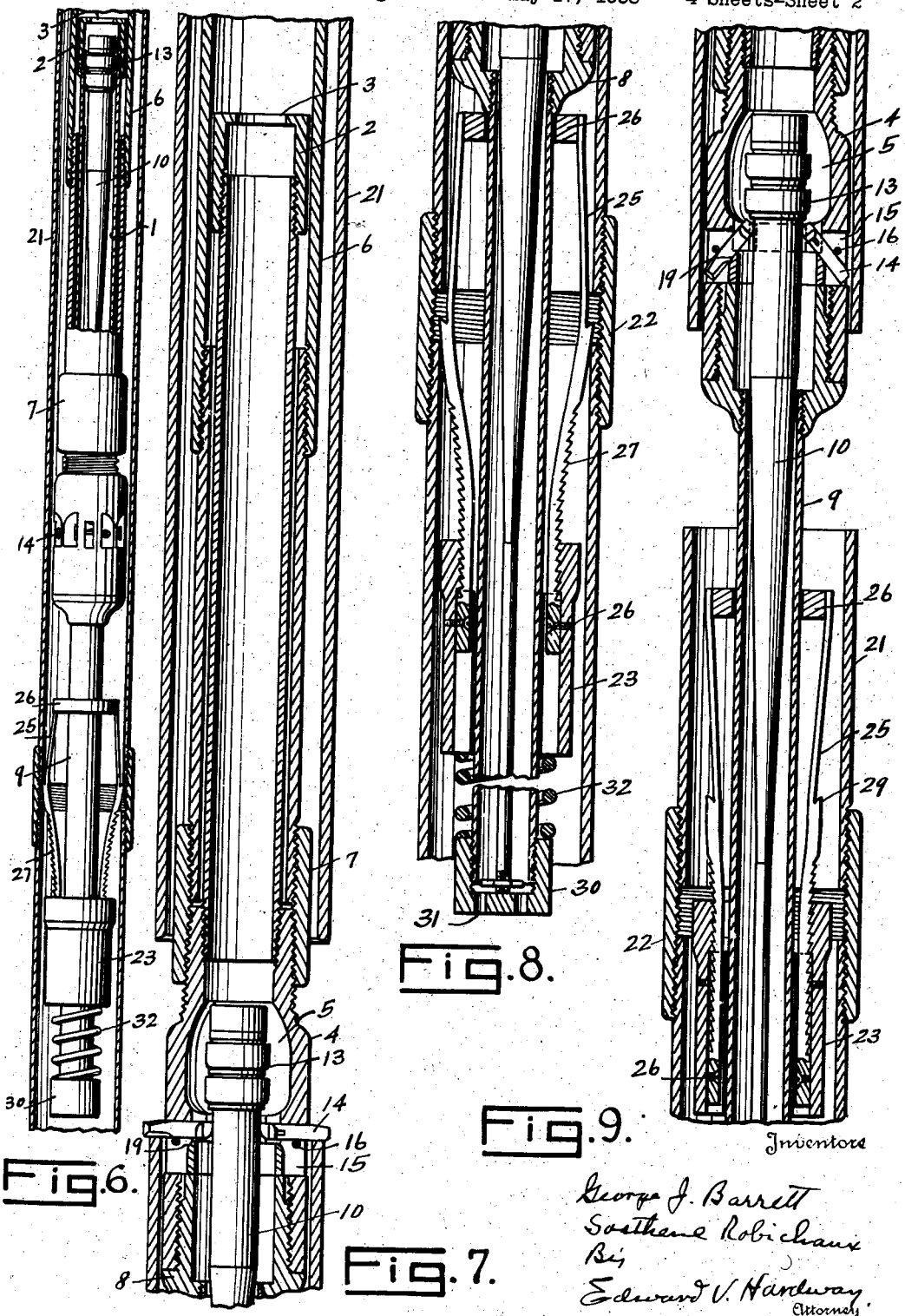

April 30, 1940.   G. J. BARRETT ET AL   2,199,020
CUTTING TOOL
Original Filed May 17, 1938   4 Sheets-Sheet 3
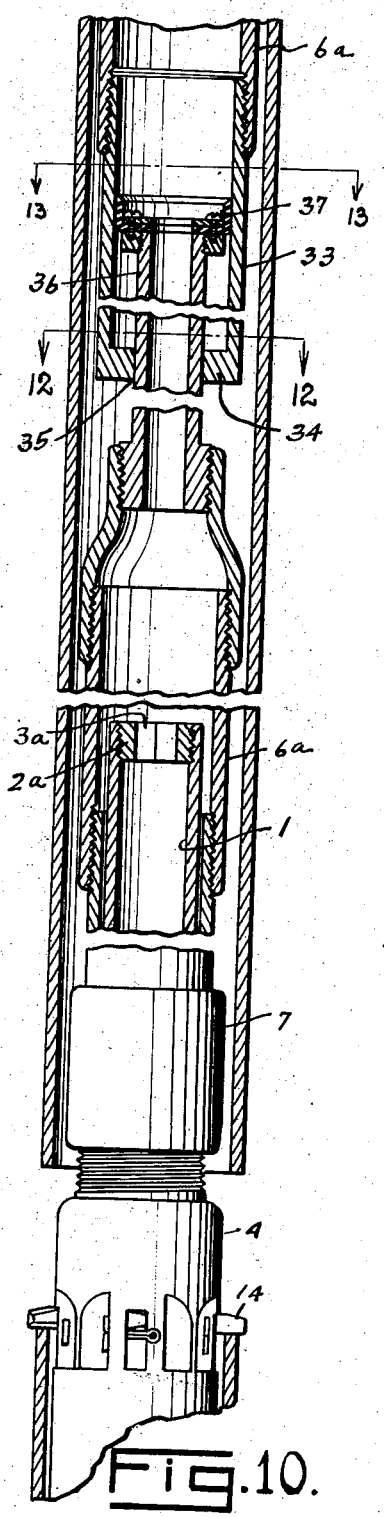
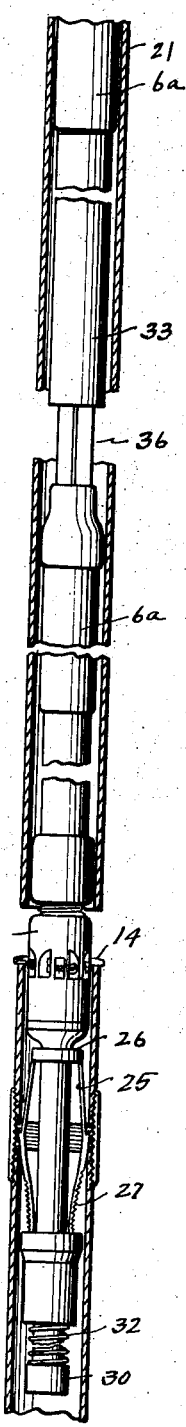
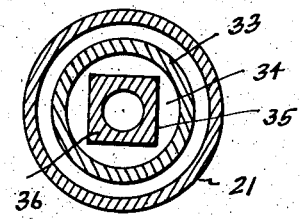
Fig.12.
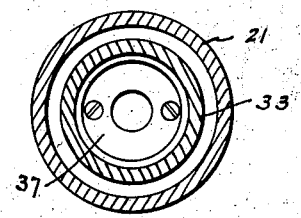
Fig.13.
Fig.10.   Fig.11.
Inventors
George J. Barrett
Sosthene Robichaux
Edward V. Hardway
Attorney

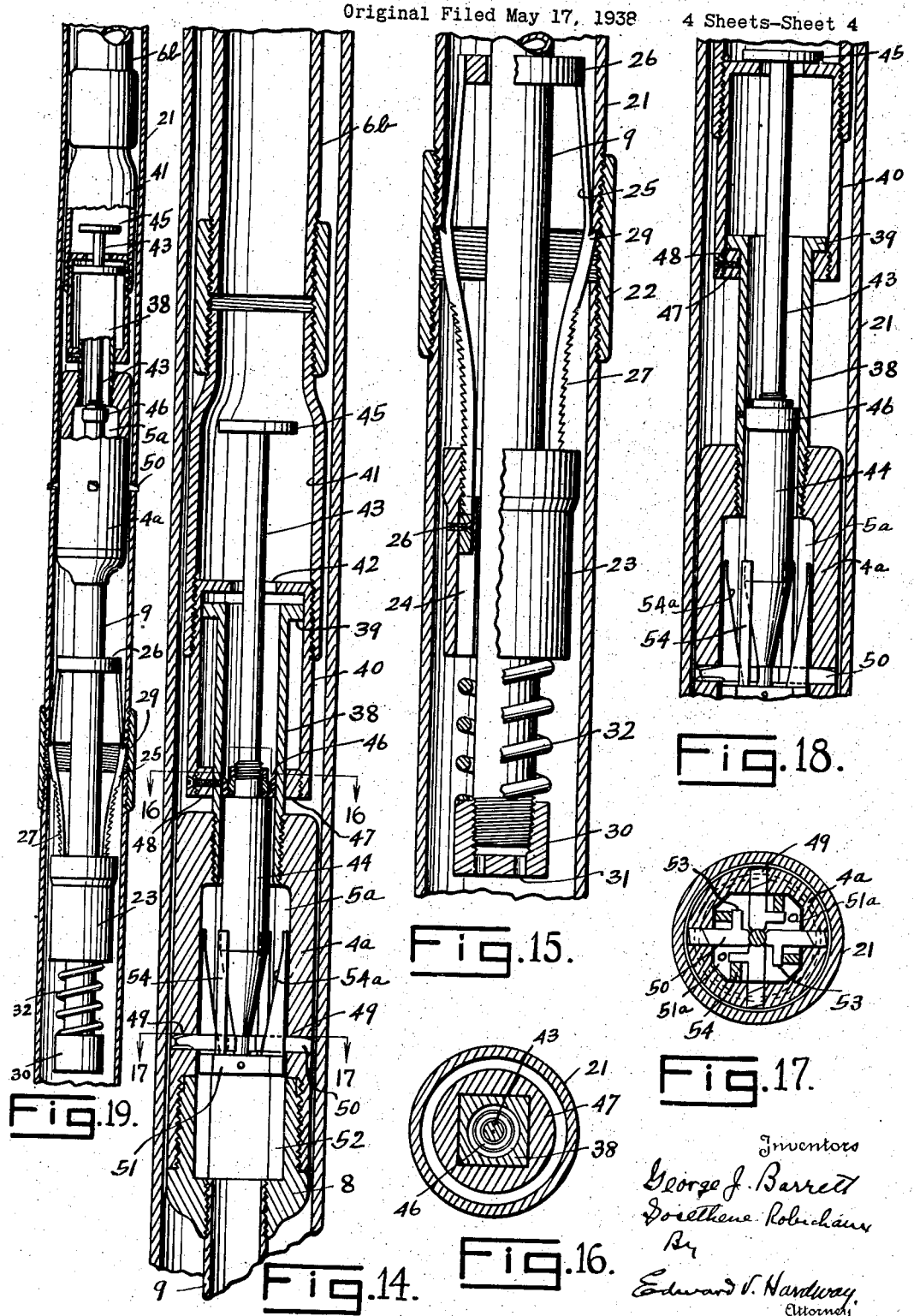

Patented Apr. 30, 1940

2,199,020

UNITED STATES PATENT OFFICE 2,199,020

CUTTING TOOL

George J. Barrett and Sosthene Robichaux, Houston, Tex.

Application May 17, 1938, Serial No. 208,362
Renewed January 15, 1940

23 Claims. (Cl. 164—0.7)

This invention relates to a cutting tool, specially designed for removing a section of pipe set in a well bore.

An object of the invention is to provide a cutting tool of the character described, for severing pipe set in a well bore and for thereafter completely removing the section of the severed pipe so as to expose the wall of the bore opposite the severed section.

It is another object to provide a tool of the character described adapted to cut by rotation and having cutters arranged to sever the pipe and to thereafter operate against the end of the section beneath and to thus gradually and completely remove an entire section of the pipe as the tool is operated and gradually lowered.

A further object of the invention is to provide, in a tool of the character described, means for definitely locating the cutters with respect to a coupling connecting the sections of the pipe to the end that the pipe will be severed and a section removed at a point distant from said coupling.

It is a further object of the invention to provide a tool of the character described including means for releasing the cutters from the pipe and for releasing said locating means whereby the tool may be readily withdrawn upon completion of the work.

It is a further object of the invention to provide a tool of the character described embodying novel means for feeding the cutters to the work, either by a weight or by pressure of the operating fluid.

With the above and other objects in view, the invention has particular relation to certain novel features of construction, operation and arrangement of parts, and to a novel method, examples of which are given in this specification and illustrated in the accompanying drawings, wherein:

Figure 1 shows a vertical, sectional view of the upper end of the tool.

Figure 2 shows a vertical, sectional view of the lower end thereof.

Figure 3 shows a cross-sectional view taken on the line 3—3 of Figure 1.

Figure 4 shows a cross-sectional view taken on the line 4—4 of Figure 1.

Figure 5 shows a cross-sectional view taken on the line 5—5 of Figure 1.

Figure 6 shows a side elevation partly in section of the complete tool shown located in a well pipe and ready for operation.

Figure 7 shows a vertical, sectional view of the upper end of the tool showing the cutters expanded into cutting relation with the pipe.

Figure 8 shows a vertical, sectional view of the lower end of the tool with the parts in the position shown in Figure 2.

Figure 9 shows a fragmentary, vertical, sectional view showing the parts retracted preparatory to withdrawing the tool.

Figure 10 shows a side view, partly in section, showing the upper end of another embodiment of the tool.

Figure 11 shows a side elevation of the complete tool of the form shown in Figure 10.

Figure 12 shows a cross-sectional view taken on the line 12—12 of Figure 10.

Figure 13 shows a cross-sectional view taken on the line 13—13 of Figure 10.

Figures 14 and 15 show, respectively, vertical, sectional views of the upper and lower ends of another embodiment of the tool.

Figure 16 shows a cross-sectional view taken on the line 16—16 of Figure 14.

Figure 17 shows a cross-sectional view taken on the line 17—17 of Figure 14.

Figure 18 shows a fragmentary, vertical, sectional view of the form shown in Figure 14, showing the parts retracted preparatory to withdrawing the tool; and Figure 19 shows a side view, partly in section, of the complete tool shown in Figures 14 and 15, with the cutters in active position.

Referring now more particularly to the drawings wherein like numerals of reference designate the same parts in each of the figures, the numural 1 designates a cylinder attached to the upper end of which there is a cap 2 whose upper end is provided with an opening 3 for the admission of an operating fluid. The lower end of the cylinder 1 is screwed into the upper end of the tubular cutter body 4 having the enlarged internal chamber 5. An operating string of pipe 6 extending to the ground surface has its lower end connected to the upper end of the cutter body, by means of an outside coupling 7. The lower end of the cutter body is attached to a reducing nipple 8 and attached to this nipple and depending therefrom there is a guide tube 9.

In the cylinder there is a downwardly tapering expander 10 whose lower end terminates in an extended guide rod 11 which extends into the guide tube 9 and has a spider 12, on the lower end thereof to guide the same. On the upper end of the expander 10 there is a plunger 13 formed of an assembly of upwardly opening cup rings suitably secured thereon and fitting closely within the cylinder whereby upon application of an operating fluid through the operating string 6 the expander will be forced downwardly.

Mounted in the cutter body 4 are the radially directed cutters 14 arranged to work through the radial guides 15 of the cutter body and supported, while in operation, by the frangible pins 16 which span the guideways 15. The cutters are normally held retracted by push springs 17 connected, at their outer ends, to the body and at their inner ends to their respective cutters. The guideways 15, as will be observed by an inspection of Figures 1, 7 and 9, are elongated downwardly to permit the outer ends of the cutters to move downwardly into diagonal position, as shown in Figure 9, upon shearing of the pins 16 when it is desired to withdraw the tool, as hereinafter explained. The guide rod 11 works between the inner ends of the cutters as shown in Figures 1 and 3 to guide the expander 10 between them upon downward movement of said expander.

Mounted on the upper end of the reducing nipple 8 and beneath the cutters 14 there is an annular cutter support 18 whose upper end is inwardly beveled as at 19 as shown in Figures 7 and 9. This support has the inside, vertical, grooves 20 forming channels for the passage of fluid and the support forms means for maintaining the cutters directed radially while severing the pipe, its upper end being beveled, as explained, to provide space to allow the cutters to assume a diagonal direction, as shown in Figure 9, upon shearing of the pins 16 in withdrawing the cutter from the severed pipe.

Means have been provided for locating the tool in the pipe 21 to be cut so that the pipe will be initially severed at a point remote from a coupling as 22 connecting sections of the pipe. For this purpose a tubular anchor 23 is mounted on the guide tube 9 and has the inside vertical grooves 24 to receive the lower ends of the outwardly bowed arms 25. The upper ends of these arms are fastened to collar 26, surrounding and freely movable on the tube 9. The arms 25 are formed of flexible material and their lower ends are fastened to the anchor 23 by frangible pins or screws 26. The outer margins of the lower ends of the arms 25 have upwardly directed ratchet teeth 27 arranged to cooperate with similar inside ratchet teeth 28 in the upper ends of the grooves 24. The arms 25 have the external, upwardly and outwardly directed shoulders 29 engageable in the joint between adjacent sections of the pipe 21 as illustrated in Figure 2. The lower end of the guide tube 9 has a cap 30 screwed thereon provided with outlet ports 31 and between this cap and the lower end of the anchor 23 there is a strong coil spring 32.

The tool is lowered into the pipe 21 in the well to the desired location, the arms 25 sliding freely in the pipe. When lowered to the desired point the tool may be pulled upwardly until the shoulders 29 engage in the next joint, between the pipe sections, above said shoulders 29, and against the lower end of the section of pipe above as shown in Figure 2 thus anchoring the tool with the cutters 14 located the required distance from the coupling 22 so that they will not cut through said coupling. The relation, or position, of the cutters 14 with respect to the coupling 22 will thus be known to the operator and, if desired, the tool may be further moved up or down to the exact point where the cut is to be made. The coupling having been located, as explained, the operator in making such adjustments of the tool will be enabled to locate said cutters at such point that they will not be opposite the coupling 22. The tool may then be rotated by rotating the operating string 6 and an operating fluid may be applied through the string 6 against the plunger 13 forcing the expander 10 downwardly gradually between the cutters 14 and moving said cutters outwardly into engagement with the pipe 21 to be cut and upon continued rotation of the tool and application of the operative fluid said cutters will be forced outwardly and will eventually sever the pipe as is illustrated in Figure 19. Thereupon the rotation is continued and the operating string gradually lowered and the upper end of the lower cut off section of the pipe 21 will gradually cut away as is illustrated in Figure 7, until a complete section of the pipe 21 is removed so as to expose the supposed producing formation of the well bore. The steel chips will be forced into the guideway below the cutters and then washed into the formation by well fluid upon penetration of the pipe.

When the pipe has been severed the expander 10 will move on downwardly under the pressure of the operating fluid, the plunger 13 into the chamber 5 and the operating fluid may then pass around said plunger and on down through the guideways 15 while the section of pipe 21 is being cut out thus relieving the pressure on the pump and indicating completion of the severing operation, said fluid returning up through the upper portion of the pipe 21 to the ground surface.

When the cutting operations have been completed and it is desired to remove the tool it may be pulled upwardly until the shoulders 29 of the outwardly bowed arms 25 engage again the lower end of the section of pipe above and upon a continued upward pull on the operating string 6 the spring 32 will be placed under compression, as shown in Figure 8, and the upward force exerted against the anchor 23 eventually shearing the pins 26 and the sudden expansion of the spring 32 will force said anchor upwardly relative to the arms 25 thus contracting said arms and holding them contracted as shown in Figure 9 and at the same time the extended cutters 14 will engage the lower end of the severed section above and the pins 16 will be sheared permitting the outer ends of the cutters to drop downwardly into diagonal position as also shown in Figure 9, clear of the pipe 21 thus permitting withdrawal of the tool from the well.

The construction of the embodiment illustrated in Figures 10 to 13, inclusive, is substantially the same as that illustrated in Figures 1 to 9, inclusive, with the exception that the operating string 6a is formed with a slip joint connection, said connection embodying a tubular nipple 33 attached to the lower end of the upper section of the operating string and whose lower end has the inwardly turned flange 34 provided with a polygonal bearing 35; said slip joint connection also embodying a tubular driving shaft 36, connected to the lower section of the operating string 6a, polygonal in cross-section and fitted snugly but slidably through the bearing 35 and having a piston 37 on its upper end fitted into the nipple 33.

Instead of the cap 2 on the cylinder 1, as shown in Figure 1, a plug 2a is screwed into said cylinder and is provided with an opening 3a for the admission of the operating fluid.

In other respects the tool disclosed in Figures 10 to 13, inclusive, is substantially the same as that shown in Figures 1 to 9, inclusive. This embodiment of the tool may be let down into the pipe to be cut and located as described in connection with the description of the form shown in Figures 1 and 2 and the pipe 21 thereby severed. The upper section of the operating string may then be lowered as far as the length of the driving shaft 36 will permit and as the rotation of the driving shaft is continued the cutters 14 will cut away the upper end of the lower severed section of the pipe 21 as illustrated in Figure 10 but the cutters 14 will not sustain the entire weight of the operating string 6a but only the lower section thereof beneath the slip joint, said lower section forming a weight to feed the cutters. There will thus be no danger of imposing too much weight on the cutters to cause them to feed too fast and to thereby become broken. The pressure of the operating fluid against the piston may also be utilized to feed the cutters to the work and in case the work becomes too severe the tool may yield upwardly against the pressure to relieve the cutters so that they will not be so liable to be broken. As the work progresses when the piston 37 reaches and engages the flange 34 so as to prevent further downward movement of the cutting tool the upper section of the operating string may be again lower and the work proceeded with in this manner until completed.

In the embodiment illustrated in Figures 14 to 19, inclusive, the cutter body 4a is somewhat longer than the body 4 shown in the other figures and has the internal chamber 5a therein. The upper end of the body 4a is reduced in diameter and the lower end of the cylinder 38 is screwed into it. The cylinder is preferably square in cross-section and its upper end has an external, annular flange 39 thereon which is fitted closely in the barrel 40.

The upper end of this barrel is screwed into the bell nipple 41 which is connected into and forms a part of the operating string 6b. The upper end of the barrel is closed excepting for a central opening 42 through which the stem 43 of the expander 44 works. This stem extends upwardly from the expander and has a disc 45 on the upper end thereof. The expander 44 works in the cylinder 38 and has a piston 46 on the upper end thereof which fits closely within said cylinder. There is an inside ring nut 47 screwed into the lower end of the barrel and pinned therein by a frangible pin 48 and the ring nut closely surrounds the cylinder 38 and forms a driving connection therewith. Working radially through the guides 49 of the cutter body there are the cutters 50 between which the lower tapered end of the expander works. A guide 51 works in a suitable guideway 52 of the reducing nipple 8 and the lower end of the expander is attached to and guided by said guide. The guide 51 has the ports 51a to permit the passage of liquid downwardly therethrough.

The inner ends of the cutters 50 have the lateral lugs 53 and the lower ends of the upstanding arms 54 are secured to the guide 51 and their inner margins 54a are upwardly tapered and engage against the outer sides of said lugs and normally hold the cutters 50 retracted but release said lugs to permit the outward movement of the cutters as the expander is moved downwardly.

In other respects than as hereinabove specified, the embodiment disclosed in Figures 14 to 19, inclusive, is the same as that shown in Figures 1 and 2.

In operation, the type of tool shown in Figures 14 and 15 may be lowered into the pipe 21 in the well to the desired location and with the cutters retracted as shown in Figure 14. When the desired location has been reached, the tool may be pulled upwardly until the shoulders 29 of the arms 25 engage in the joint between adjacent sections of the pipe 21 as illustrated in Figure 15. This will locate the cutters 50 at a point remote from the coupling 22 connecting said sections. Thereupon the tool may be turned by the operating string 6b and an operating fluid under pressure forced downwardly through the operating string by a pump and this fluid will engage the piston 46 and force the expander 44 downwardly gradually expanding the cutters into contact with the pipe 21 and upon continuation of the rotation and pressure said pipe will be severed, as shown in Figure 19. Upon severing the pipe, the plunger 46 will move into the chamber 5a of the cutter body to permit circulation of the operating fluid downwardly past said plunger. The operating string may then be gradually rotated and the cutters will operate against the upper end of the lower severed section of the pipe 21 until a section thereof has been cut away and removed as illustrated in Figures 7 and 10.

When it is desired to withdraw the tool from the pipe, an upward pull may be exerted through the string 6b, and upon engagement of the shoulders 29, in the next succeeding joint, a continued upward pull will cause the pin 48 to shear, causing the upper end of the barrel 40 to engage the disc 45, to withdraw the expander from between the cutters 50, and upon such upward movement the tapering margins 54a of the arms 54 will engage the lugs 53 and retract the cutters 50 and a continued upward pull on the operating string 6b will place the spring 32 under compression and the resistance of said spring under compression against the anchor 23 will eventually shear the pins 26 causing the anchor to suddenly move upwardly over the arms 25 disengaging the shoulders 29 from the joint connecting the sections of the pipe 21, as shown in Figure 9, and thereupon the tool may be withdrawn from the well.

A section of the pipe 21 set in the well may be removed for the purpose of side tracking the lower end of the original bore, as for example, when the bore becomes obstructed or deflected. When a section of the desired length has been cut out a whip stock may be set opposite the open portion of the bore for the purpose of deflecting the drill in the well known manner and drilling may be proceeded with to deepen the bore or straighten it. However, it may be found desirable to cut out a section of the set casing opposite a known producing stratum for the purpose of setting a screen opposite said stratum. When a section of the casing, opposite the producing stratum, has been cut out the casing may be cemented above and beneath the cut out portion and a screen then set opposite the producing stratum. It is now common practice to perforate casing opposite the producing stratum and, if necessary, set the screen but the perforations through the casing sometimes become clogged up and it is preferable to entirely remove the section of casing opposite the producing stratum so as to permit the free unobstructed inflow of the oil from the stratum through the screen.

What we claim is:

1. A pipe cutting tool adapted to cut by rotation and shaped to enter a pipe in a well and comprising means engageable with a recess in the pipe, upon upward movement of the tool, to anchor the tool in the pipe to be cut, outwardly movable cutting means, means arranged to be actuated by an operating fluid to force the cutting means outwardly into cutting relation with the pipe.

2. A pipe cutting tool adapted to cut by rotation and shaped to enter a pipe in a well and comprising anchoring means engageable in a joint of the pipe to be cut, upon upward movement of the tool in the pipe, to limit such upward movement, outwardly movable cutting means, means for moving the cutting means outwardly into cutting relation with the pipe to sever the pipe upon rotation of the tool.

3. A pipe cutting tool adapted to cut by rotation and shaped to enter a pipe in a well and comprising anchoring means engageable in a joint of the pipe to be cut, upon upward movement of the tool in the pipe, to limit such upward movement, outwardly movable cutting means, means for moving the cutting means outwardly into cutting relation with the pipe to sever the pipe upon rotation of the tool, said anchoring means and cutters being retractable to permit withdrawal of the tool from the pipe.

4. A pipe cutting tool adapted to cut by rotation and shaped to enter a pipe in a well and comprising cutting means movable outwardly into cutting relation with the pipe, means engageable in a joint of the pipe upon upward movement of the tool for locating the cutting means spaced from said joint, and means releasable in response to a tensile strain on the tool and effective, when released, to retract said locating means to release the same from the pipe.

5. A pipe cutting tool adapted to cut by rotation and shaped to enter a pipe in a well and comprising a cutter body, an operating string to which the body is attached, outwardly movable cutting means on the body, means for moving the cutting means outwardly, releasable means engageable with an inside projection on the pipe upon upward movement of the tool in the pipe, means including a compression spring, effective to retract said releasable means, in response to a predetermined upward tensile strain on the string.

6. A pipe cutting tool adapted to cut by rotation and shaped to enter a pipe in a well and comprising a cutter body, an operating string to which the body is attached, outwardly movable cutting means on the body, means for moving the cutting means outwardly, releasable means engageable with an inside projection on the pipe upon upward movement of the tool in the pipe, means including a compression spring, effective to retract said releasable means, in response to a predetermined upward tensile strain on the string, and to release the same from the pipe and means normally supporting the cutting means but frangible, to permit retraction of the cutting means, in response to a predetermined stress thereon.

7. A pipe cutting tool adapted to cut by rotation and shaped to enter a pipe in a well and comprising a cutter body, an operating string to which the body is attached, outwardly movable cutting means on the body, means for moving the cutting means outwardly, a guide depending from the body, an anchor on the guide, retractable means engageable with the inside of the pipe, frangible means for attaching the retractable means to the anchor, means adapted to apply an upward thrust to the anchor, upon upward movement of the guide, to shear said frangible means and disengage the retractable means from the pipe.

8. A pipe cutting tool adapted to cut by rotation and shaped to enter a pipe in a well and comprising a cutter body, an operating string to which the body is attached, outwardly movable cutting means on the body, means for moving the cutting means outwardly, a guide depending from the body, an anchor on the guide, retractable means engageable with the inside of the pipe, means for attaching said retractable means to the anchor, resilient means operable against the anchor upon application of upward tension on the guide and effective to shear said attaching means and impart an upward thrust to the anchor about the retractable means to disengage the latter from the pipe.

9. A pipe cutting tool adapted to cut by rotation and shaped to enter a pipe in a well and comprising a cutter body, a cylinder thereon, outwardly movable cutting means on the body, an expander having a plunger thereon in the cylinder, an operating string through which an operating fluid may be applied to the plunger to move the expander downwardly and to force the cutting means outwardly, said tool having a by-pass passageway to permit passage of the operating fluid around the plunger when the plunger has reached the limit of its downward movement.

10. A pipe cutting tool adapted to cut by rotation and shaped to enter a pipe in a well and comprising a cutter body, an operating string to which the body is attached, outwardly movable cutting means on the body, means normally holding the cutting means retracted into inner position, releasable means engageable with an inside projection on the pipe upon upward movement of the tool in the pipe, an expander movable downwardly in response to pressure of an operating fluid and effective to move the cutting means outwardly into cutting relation with the pipe, means for withdrawing the expander from active position to permit retraction of the cutting means, upon initial upward movement of the operating string and means effective to retract said releasable means upon further upward movement of the operating string to permit withdrawal of the tool from the pipe.

11. A pipe cutting tool adapted to cut by rotation and shaped to enter a pipe in a well and comprising an operating string, cutting means thereon, means for moving the cutting means outwardly into cutting relation with the pipe whereby the pipe will be completely severed, said cutting means being effective to thereafter completely remove a section of said pipe upon rotation and further downward movement of the tool.

12. A pipe cutting tool shaped to enter a pipe in a well and comprising an operating string formed of upper and lower sections connected for relative longitudinal movement, outwardly movable cutting means on the lower section, means for moving the cutting means outwardly to sever the pipe upon rotation of the tool and to remove a section of said pipe upon continuation of such rotation and the downward movement of said lower section of the string.

13. A pipe cutting tool adapted to cut by rotation and shaped to enter a pipe in a well and comprising an operating string, cutting means connected to the string and adapted to be lowered thereby into the pipe to be cut, means for moving the cutting means outwardly into cutting relation with the pipe whereby the pipe will be completely severed, and the cutting means projected through the cut, upon rotation of the tool, said cutting means being shaped to thereafter completely cut away and remove a section of the pipe upon rotation and further downward movement of the tool and means for causing such further downward movement independent of the downward movement of the string.

14. A pipe cutting tool shaped to enter a pipe in a well and comprising an operating string formed of upper and lower sections having a driving connection formed to permit relative longitudinal movement of said sections, outwardly movable cutting means on the lower section, means for moving the cutting means outwardly to sever the pipe and to extend entirely through the cut upon rotation of the tool, said cutting means having a downwardly directed edge whereby upon continuation of such rotation and the downward movement of the lower section of the string, a section of the cut pipe beneath the cutting means will be completely removed.

15. A cutting tool shaped to enter a pipe in a well and comprising means for locating the tool with respect to a coupling of the pipe, cutting means spaced from the locating means for severing the pipe upon rotation of the tool, a weight for moving the tool downwardly subsequently to the severing operation.

16. A cutting tool shaped to enter a pipe in a well comprising an operating string, means for locating the tool in the pipe with respect to a coupling of the pipe, cutting means, means for moving the cutting means outwardly to sever the pipe upon rotation of the tool, a weight forming part of the operating string for moving the tool downwardly, as the tool is rotated, subsequent to the severing operation.

17. A cutting tool shaped to enter a pipe in a well and comprising an operating string, means for locating the tool in the pipe at a definite location with respect to a pipe coupling, outwardly movable cutting means, means for moving the cutting means outwardly to sever the pipe upon rotation of the tool and means whereby the tool may be moved downwardly in response to the pressure of fluid exerted through the string, subsequent to the severing operation.

18. A cutting tool shaped to enter a pipe in a well and adapted to cut by rotation and comprising an operating string, cutting means adapted to sever the pipe upon rotation of the tool, a weight forming a part of the string and adapted to move the cutting means downwardly, subsequent to the severing operation to completely cut away and remove a section of the pipe and means responsive to the pressure of fluid exerted through the string and effective to act in conjunction with said weight to move the tool downwardly.

19. A cutting tool shaped to enter a pipe in a well and adapted to cut by rotation and comprising an operating string, means for locating the tool at a definite location in the pipe with respect to a coupling of the pipe, outwardly movable cutting means, means independent of movement of the string for moving the cutting means outwardly into cutting relation with the pipe whereby the pipe will be severed upon rotation of the tool, means for retracting the cutting means radially upon initial upward movement of the string and for releasing the locating means upon further upward movement of the string to release the tool for withdrawal from the pipe.

20. A pipe cutting tool shaped to enter a pipe in a well and adapted to cut by rotation and comprising an operating string, means for locating the tool at a definite location in the pipe with respect to a coupling of the pipe, outwardly movable cutting means, expanding means for moving the cutting means outwardly into cutting relation with the pipe whereby the pipe will be severed upon rotation of the tool, means on the expanding means for retracting the cutting means radially upon initial upward movement of the string and means for thereafter releasing the locating means upon further upward movement of the string whereby the tool will be released for withdrawal from the pipe.

21. A cutting tool shaped to enter a pipe in a well and adapted to cut by rotation and comprising a cutter body, outwardly movable cutting means thereon, means for moving the cutting means outwardly into cutting relation with the pipe whereby said pipe will be severed, upon rotation of the tool, means for moving the tool downwardly, subsequent to the severing operation to completely cut away and remove a section of the pipe, said last mentioned means being effective to hold the cutting means yieldingly against the work.

22. A pipe cutting tool adapted to cut by rotation and shaped to enter a pipe in a well and comprising a cutter body, outwardly movable cutting means on the body, means for moving the cutting means outwardly into cutting relation with the pipe, to sever the pipe, upon rotation of the tool, said cutting means being movable downwardly and inwardly upon subsequent upward movement of the tool in the pipe.

23. A pipe cutting tool adapted to cut by rotation and shaped to enter a pipe in a well and comprising a cutter body, outwardly movable cutting means on the body, means for moving the cutting means outwardly into cutting relation with the pipe, to sever the pipe, upon rotation of the tool, said cutting means being movable downwardly and inwardly, upon engagement thereof with the lower end of the severed section of the pipe above, upon subsequent upward movement of the tool.

GEORGE J. BARRETT.
SOSTHENE ROBICHAUX.